United States Patent [19]

Ohshima

[11] Patent Number: 5,436,877
[45] Date of Patent: Jul. 25, 1995

[54] METHOD FOR CONTROLLING THE GAIN OF A TRACKING SERVO CIRCUIT

[75] Inventor: Youichi Ohshima, Kanagawa, Japan

[73] Assignee: Sony Corporation, Japan

[21] Appl. No.: 301,134

[22] Filed: Sep. 6, 1994

Related U.S. Application Data

[63] Continuation of Ser. No. 975,274, Nov. 12, 1992, abandoned.

[30] Foreign Application Priority Data

Nov. 22, 1991 [JP] Japan .................. 3-332857

[51] Int. Cl.⁶ ............................................. G11B 7/00
[52] U.S. Cl. ..................... 369/44.35; 369/44.29; 369/44.36
[58] Field of Search .............. 369/44.35, 44.36, 44.27, 369/44.29, 44.25, 50

[56] References Cited

U.S. PATENT DOCUMENTS

| | | | |
|---|---|---|---|
| 4,623,994 | 11/1986 | Nabeshima et al. | 369/44.36 |
| 4,698,795 | 10/1987 | Yoshio | 369/44.25 X |
| 4,761,692 | 8/1988 | Yoshida et al. | 369/50 X |
| 4,890,273 | 12/1989 | Takeuchi et al. | 369/44.36 |
| 5,101,391 | 3/1992 | Ishii et al. | 369/44.29 |
| 5,148,425 | 9/1992 | Sakata | 369/44.25 |
| 5,210,732 | 5/1993 | Suenaga et al. | 369/44.29 |

FOREIGN PATENT DOCUMENTS

| | | |
|---|---|---|
| 0265287A2 | 4/1988 | European Pat. Off. |
| 0305191A2 | 3/1989 | European Pat. Off. |
| 0233435 | 10/1986 | Japan .................. 369/44.35 |
| 0113437 | 4/1990 | Japan .................. 369/44.35 |

OTHER PUBLICATIONS

Patent Abstracts of Japan, vol. 10, No. 140 (P-458)(2197), 23 May 1986 & JP-A-60 258 775 (Toshiba), 20 Dec. 1985.

Patent Abstracts of Japan, vol. 8, No. 141 (P-283), 30 Jun. 1984 & JP-A-59 038 973 (Sony), 3 Mar. 1984.

*Primary Examiner*—Aristotelis Psitos
*Assistant Examiner*—Thang V. Tran
*Attorney, Agent, or Firm*—Limbach & Limbach

[57] ABSTRACT

An optical disk player having a tracking servo loop comprising tracking error signal generating means and tracking driving means for operating a tracking mechanism in an optical head based on a tracking error signal generated. In the tracking servo loop, a servo gain selector is installed to selectively provide a first gain suitable for a recording and/or reproducing operation and a second gain which is higher than the first, thereby keeping the second gain selected only during the period from the beginning to completion of a tracking servo positioning operation.

1 Claim, 3 Drawing Sheets

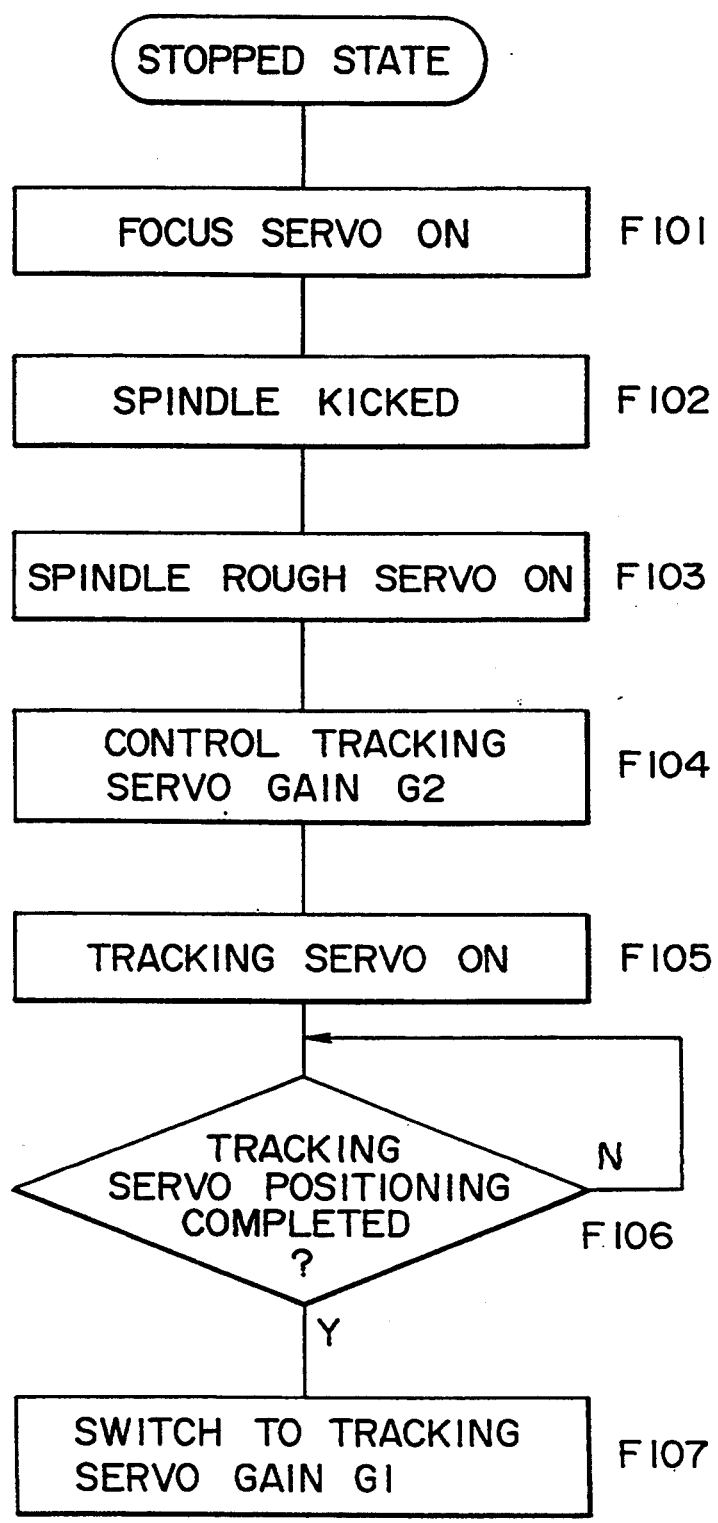

METHOD FOR CONTROLLING THE GAIN OF A TRACKING SERVO CIRCUIT

This is a continuation of application Ser. No. 07/975,274 filed on Nov. 12, 1992, now abandoned.

BACKGROUND OF THE INVENTION

1. Field of the Invention

The present invention relates to an optical disk player and, more particularly, to an optical disk player which records and/or reproduces data on an optical disk.

2. Description of the Prior Art

Optical disk players in which a laser beam is radiated onto an optical disk to write information on the disk or read information from it are widely used. Optical disks are effectively used as a medium to store voice and video signals and other forms of data, finding their applications in such apparatus as compact disk, television game, and video disk players.

All of these optical disk players require a track-following servo system for correctly forming a beam spot on a recording track on a rotating optical disk to read or write information on it. Usually, this track-following servo system has both a roughly operating actuator (thread mechanism) driven by a linear motor or other means to move an entire optical head in the radial direction of an optical disk and a biaxial mechanism to move the objective in the optical head in the tracking direction (parallel to the surface of the optical disk and across recording tracks) and focus direction (vertical to the surface of the optical disk and parallel to the optical axis of the objective). These tracking control mechanisms are controlled by a tracking error signal obtained by processing the output signal from the optical head.

Illustratively, when starting a recorded-information reproducing operation on a player which reads an optical disk such as a compact disk, a focus servo operation is activated to be closed and a rough spindle servo operation for a spindle motor to rotate the compact disk is performed, followed by a track positioning operation controlled by the biaxial mechanism to position the optical head to the specified recording track. When the track positioning operation has been completed, the biaxial mechanism and the thread mechanism are controlled so that the laser beam correctly follow the recording track while, on the compact disk player, the rough spindle servo operation is activated to close the servo loop.

It should be noted that optical disks on which data are recorded and/or reproduced by the optical disk player are slightly uneven from disk to disk in the reflectivity of the recording or reflective medium coated on disk or may have scratches on the recording medium. However, since the tracking error signal is generated from the output of a detector which senses the laser beam reflected from the optical disk, an unstable tracking servo operation may result unless the status of the reflected beam is stable. The unstable tracking servo operation especially causes a lengthy tracking servo positioning operation.

It should also be noted that when an optical disk is chucked, it is unavoidably held slightly off-center. This eccentricity also makes it difficult to perform a correct tracking operation, necessarily causing problems such as a lengthy tracking servo positioning operation and the generation of servo noises.

OBJECTS AND SUMMARY OF THE INVENTION

It is therefore an object of the present invention to provide an apparatus which stabilizes and shortens the positioning operation of a track-following servo system.

In carrying out the invention and according to one aspect thereof, there is provided an optical disk player comprising: optical head means for recording and/or reproducing data by scanning a laser beam along tracks formed concentrically or spirally on the recording surface of optical disk; a tracking servo loop consisting of tracking error signal generating means and tracking driving means for operating the tracking mechanism of the optical head means based on a tracking error signal generated; and servo gain selecting means installed in the tracking servo loop for switching between a first gain suitable for a recording and/or reproducing operation and a second gain higher than the first; wherein a servo gain switch capable of selectively provide a first gain suitable for a recording/reproduction operation and a second gain higher than the first gain is provided inside a tracking servo loop consisting of a tracking error signal generator and a tracking driver for driving the tracking mechanism of the optical head based on a tracking error signal from the tracking error signal generator, wherein the second gain is kept selected by the servo gain selecting means only for the period until the completion of a tracking servo positioning operation during that operation. Thus, raising a servo gain in a tracking servo positioning operation stabilizes and shortens the operation while preventing the generation of servo noises.

These and other objectives as well as advantages of the present invention will become clear by the following description of a preferred embodiment of the present invention with reference to the accompanying drawings.

BRIEF DESCRIPTION OF THE DRAWINGS

FIG. 3 is a flowchart depicting the operation of the controller for a tracking-in operation of the preferred embodiment of the present invention.

DESCRIPTION OF THE PREFERRED EMBODIMENTS

Figure 1:
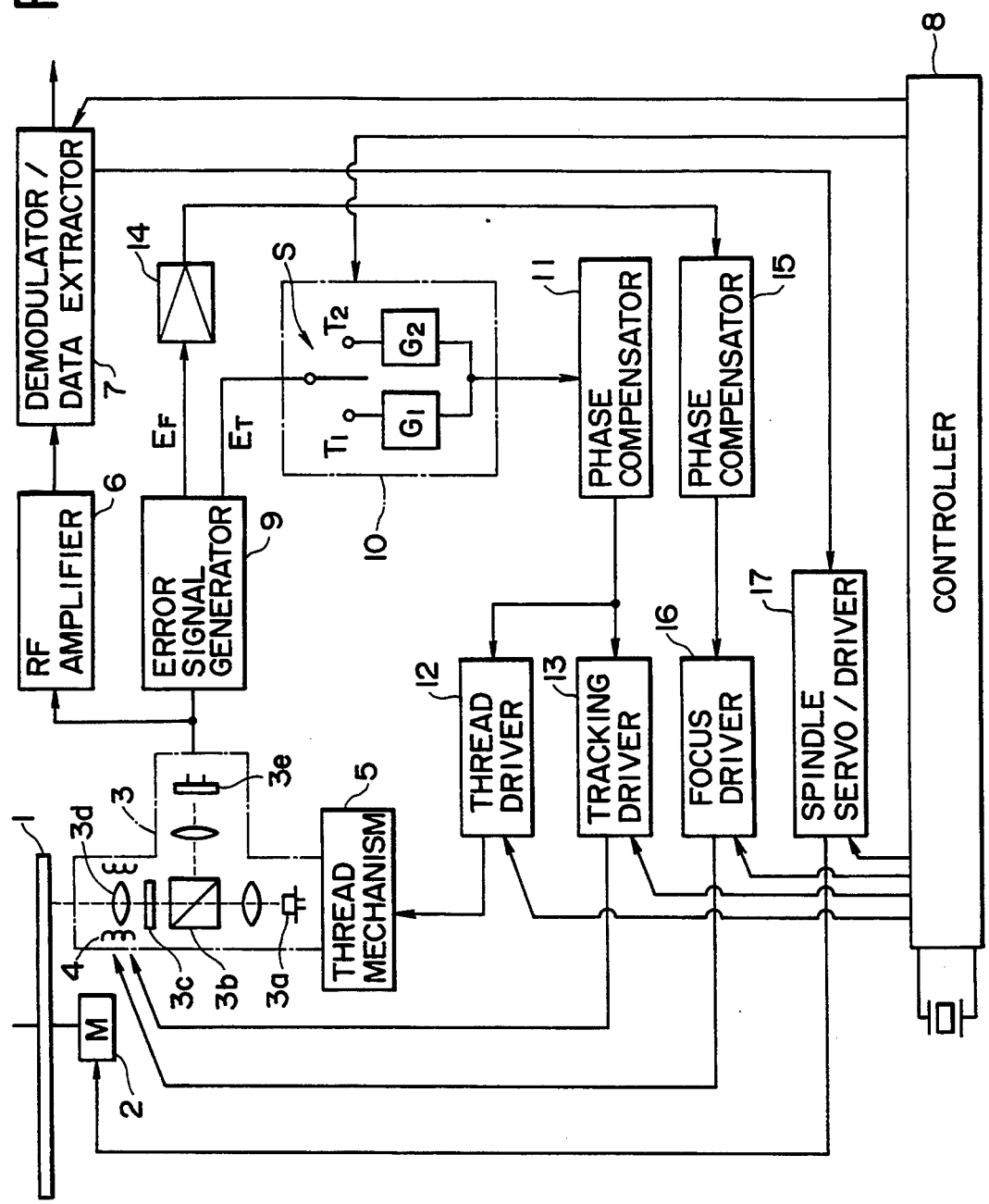
FIG. 1 is a block diagram of an optical disk player as the preferred embodiment of the present invention.
Figure 2:
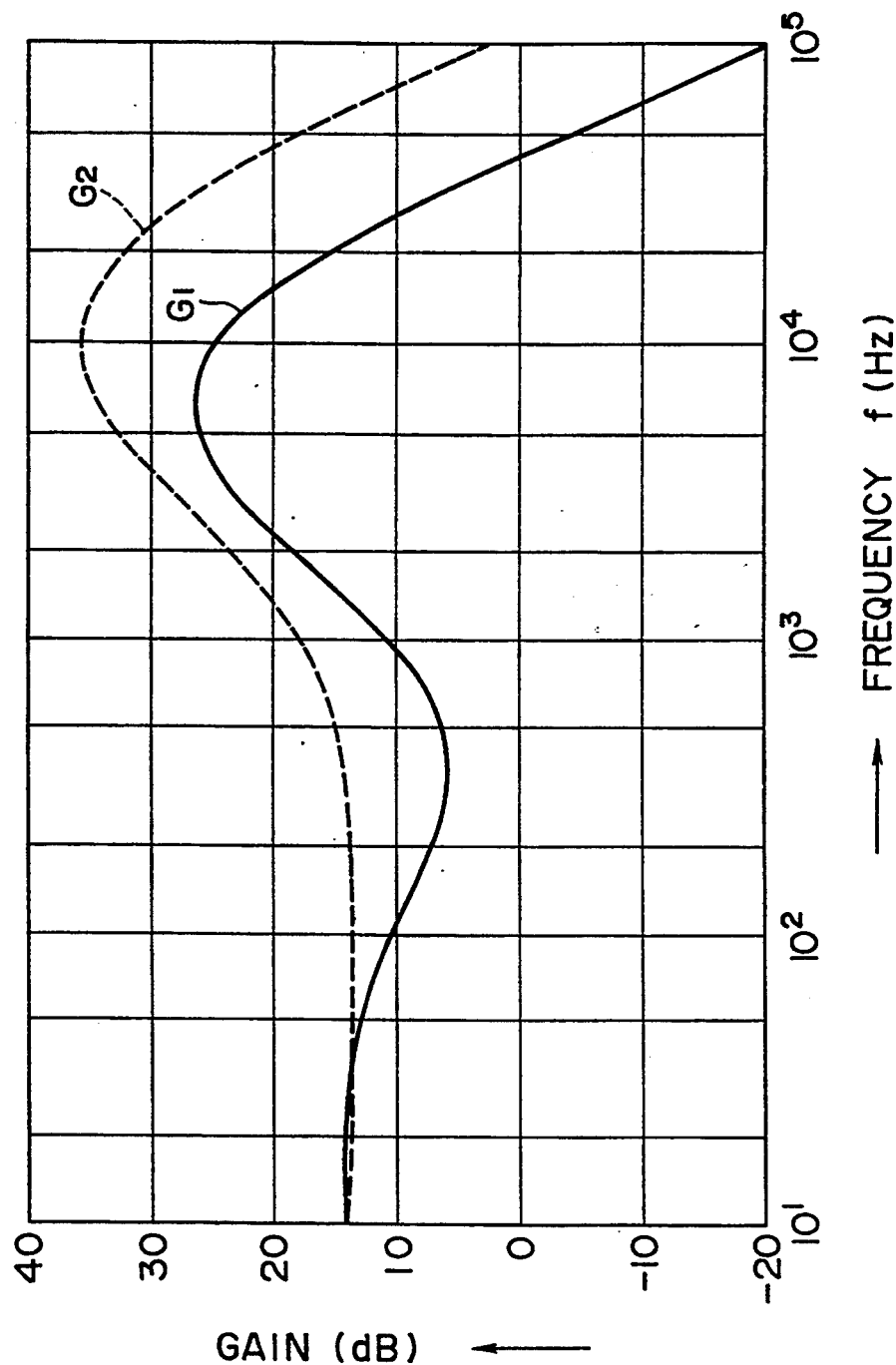
FIG. 2 illustrates the tracking servo gain characteristics of the present invention.

Referring to FIGS. 1 to 3, a preferred embodiment of the present invention is described as follows. It should be noted that this embodiment will find its applications in apparatus including game playing apparatus which use an optical disk player and optical disks.

FIG. 1 is a block diagram of the optical disk player, mainly showing its servo control system. Reference numeral 1 indicates an optical disk, reference numeral 2 indicates a spindle motor for rotating the optical disk 1 at a constant linear velocity (CLV) for example, and reference numeral 3 indicates an optical head for radiating a laser beam onto the optical disk 1 and sensing the reflected beam from the optical disk 1 to obtain reproduced data. The optical head 3 has an optical system consisting of a semiconductor laser 3a, a polarized-beam splitter 3b, a quarter-wave plate 3c, an objective 3d, and a detector 3e.

The optical head 3 also has a biaxial mechanism (fine actuator) 4 for driving the objective 3d serving as a laser output end in the direction of approaching or departing from the optical disk 1 and in its radial direction. The optical head 3 is driven in the radial direction of the optical disk 1 by a thread mechanism (rough actuator) 5.

The optical head 3 contains, in the path of the laser beam emitted from the semiconductor laser 3a, a diffraction grating for separating the laser beam into three beams to obtain a tracking error signal. (Refer to U.S. Pat. No. 3,876,842, for example,) The optical head 3 also contains, between the polarized-beam splitter 3b and the detector 3e in the path of the reflected laser beam from the optical disk 1, an optical device such as a cylindrical lens for producing an astigmatism to obtain a focus error signal. For the generation of the focus error signal, refer to U.S. Pat. No. 4,023,033, for example.

Reference numeral 6 indicates an RF amplifier for amplifying the reproduced RF signal coming from the optical head 3 and reference numeral 7 indicates a circuit for demodulating the reproduced RF signal to extract data. The demodulator/data extractor 7 provides the data reproduced from the optical disk 1 and the subcode data including time code and index information.

Reference numeral 8 indicates a mechanical controller (hereinafter referred to simply as the controller) for controlling a recording and/or reproducing operation of the optical disk 1, based on control by a system controller, not shown. To be more specific, the controller 8 controls a laser beam on/off operation by the optical head 3, a spindle motor operation, and focus servo, spindle servo, and rough and fine tracking servo operations.

Reference numeral 9 indicates an error signal generator for performing a specified operational processing on the reproduced RF signal from the optical head 3 to generate a tracking error signal Et and a focus error signal Ef. The generated tracking error signal Et is supplied through a servo gain amplifier section 10 and a phase compensator 11 to a thread driver 12 for driving the thread mechanism 5 and to a tracking driver 13 for driving the biaxial mechanism 4 in the direction parallel to the optical disk 1.

The tracking driver 13 applies a tracking drive voltage to a biaxial mechanism 4 based on the tracking error signal Et to make the laser beam from the optical head 3 correctly follow tracks for a reproducing or recording operation. A thread driver 12 applies a drive voltage to the thread mechanism 5 to make it perform an access operation when recording/reproducing data or instructing a seek operation based on a control signal from the controller 8. The thread driver 24 also generates a drive signal based on the tracking error signal Et to feed the optical head 3 in the radial direction of the optical disk 1 at a recording/reproducing operation.

The focus error signal Ef generated by the error signal generator 9 is supplied through a servo gain amplifier 14 and a phase compensator 15 to a focus driver 16 which drives the biaxial mechanism 4 in the direction vertical to the optical disk 1. The focus driver 16 applies a focus drive voltage to the biaxial mechanism 4 to perform focus control.

Reference numeral 17 indicates a spindle servo system for controlling the rotational speed of a spindle motor 2. The spindle servo system 17 compares the clock component obtained by applying a reproduced RF signal to a PLL circuit in the demodulating/data extracting circuit 7 with the system clock from the controller 8 to generate a drive signal and supply it to the spindle motor 2 to provide a rotational driving operation at a constant linear velocity (CLV) for example.

With an embodiment of the present invention, there is provided in the servo gain amplifier section 10 of the tracking servo system a first amplifier $G_1$ for adding a servo gain suitable for a normal recording/reproducing operation and a second amplifier $G_2$ for adding a servo gain greater than the normal level, these amplifiers being switched between by, for example, operating a selector S. The gain-frequency characteristics of amplifiers $G_1$ and $G_2$ are shown in FIG. 2 in a solid line and a dashed line respectively.

Referring to FIG. 3, the operation of the controller 8 at a tracking servo positioning operation on the optical disk player as an embodiment of the present invention is described as follows.

To start a reproducing operation on the optical disk 1 loaded by loading means, not shown, and in the stopped state, the focus servo system is first turned on to drive the biaxial mechanism 4 so that a laser beam is radiated onto the recording surface of the optical disk 1 at the focus position (F101). Next, an actuating signal is applied to the spindle motor 2 to drive it (F102) and close the spindle servo system. The clock component obtained from the reproduced RF signal generated as a result of the above operation is compared with the system clock to perform a rough spindle control operation.

Then, the tracking servo system is turned on to drive the biaxial mechanism 4 and/or the thread mechanism 5 to perform a tracking servo positioning operation, in which a switching control signal is first applied to the servo gain amplifier 10 to make connection with a contact $T_2$. That is, a tracking error signal Et provided with a servo gain given by the amplifier $G_2$ having the characteristic represented in the dashed line in FIG. 2 is applied to the tracking driver 13 and the thread driver 12 (F104). The tracking servo system is then turned on to perform a tracking servo positioning operation (F105).

The completion of the tracking servo positioning operation is confirmed when the subcode has been read from the reproduced RF signal from the optical disk 1 upon completion of a spindle servo latching operation at the time a match has been found between the phase of the clock component obtained from the reproduced RF signal and the phase of the reference clock. When the completion of the tracking servo positioning operation has been thus confirmed (F106), a switching control signal is applied again to the servo gain amplifier section 10 to switch the selector S to a contact $T_1$. That is, the tracking error signal with a servo gain given by the amplifier $G_1$ having the characteristic represented in the solid line in FIG. 2 is applied to the tracking driver 13 and the thread driver 12 (F107), thereafter controlling the track-following operation by the biaxial mechanism 4 based on this tracking error signal Et and the track-following operation and seek operation (track long jump operation) by the thread mechanism 5 as usual.

Accordingly, with an embodiment of the present invention, raising a tracking servo gain only during a tracking servo positioning operation stabilizes the tracking servo positioning operation, thereby shortening the tracking servo positioning time and preventing servo noises from generating at turning on the tracking servo system.

It should be understood that the constitution of the optical disk player, the optical disk to be operated on it, and the way in which the controller performs its processing are not limited to a preferred embodiment of the present invention and that various changes and modifications may be made in the invention without departing from the spirit and scope thereof.

As described and according to the invention, there is provided an optical disk player which increases a tracking servo gain only during a tracking servo positioning operation to stabilize the operation, thereby shortening the tracking servo positioning time and preventing servo noises from being generated.

What is claimed is:

1. A method for varying the gain during a leading-in operation of a tracking servo circuit of an optical disk recording and/or reproducing apparatus, the method comprising the steps of:

providing an optical disk having a plurality of recording tracks;

radiating a laser beam onto the optical disk;

rotating the radiated optical disk;

detecting a reflected laser beam from the rotating optical disk;

extracting a reproduced RF signal from the reflected laser beam;

extracting a data clock signal and data from the comparing the data clock signal with a system clock signal;

controlling the rotation of the optical disk in response to a difference between the data clock signal and the system clock signal;

switching a high gain stage into the tracking servo circuit a time period after the data clock signal is compared to the system clock signal;

energizing the high gain tracking servo circuit;

detecting when the phase of the data clock signal matches the phase of the system clock signal; and switching the high gain stage out of the tracking servo circuit, and switching a low gain stage into the tracking servo circuit when the subcode is read from the data extracted from the reproduced RF signal, and the phase of the data clock signal matches the phase of the system clock signal, the tracking servo circuit only utilizing the low gain stage after the high gain stage has been switched out.

* * * * *

UNITED STATES PATENT AND TRADEMARK OFFICE
CERTIFICATE OF CORRECTION

PATENT NO. : 5,436,877
DATED : July 25, 1995
INVENTOR(S) : Youichi Ohshima

It is certified that error appears in the above - identified patent and that said Letters Patent is hereby corrected as shown below:

Column 6, line 3, before "from", insert --including a subcode--;

Column 6, line 3, after "the", insert --reproduced RF signal;--.

Signed and Sealed this

Third Day of October, 1995

Attest:

BRUCE LEHMAN

Attesting Officer      Commissioner of Patents and Trademarks